(12) United States Patent
Kim et al.

(10) Patent No.: US 10,643,444 B2
(45) Date of Patent: May 5, 2020

(54) FACILITY MANAGEMENT SYSTEM USING INTERNET OF THINGS (IOT) BASED SENSOR AND UNMANNED AERIAL VEHICLE (UAV), AND METHOD FOR THE SAME

(71) Applicant: KOREA INSTITUTE OF CIVIL ENGINEERING AND BUILDING TECHNOLOGY, Gyeonggi-do (KR)

(72) Inventors: Hyeong Yeol Kim, Gyeonggi-do (KR); Jong Sup Park, Gyeonggi-do (KR)

(73) Assignee: KOREA INSTITUTE OF CIVIL ENGINEERING AND BUILDING TECHNOLOGY, Gyeonggi-do (KR)

( * ) Notice: Subject to any disclaimer, the term of this patent is extended or adjusted under 35 U.S.C. 154(b) by 348 days.

(21) Appl. No.: 15/378,055

(22) Filed: Dec. 14, 2016

(65) Prior Publication Data
US 2018/0151045 A1   May 31, 2018

(30) Foreign Application Priority Data
Nov. 28, 2016   (KR) .......................... 10-2016-0158980

(51) Int. Cl.
*G08B 21/02*   (2006.01)
*H04N 5/232*   (2006.01)
(Continued)

(52) U.S. Cl.
CPC ............ *G08B 21/02* (2013.01); *B64C 39/024* (2013.01); *G05D 1/0038* (2013.01); *G05D 1/0094* (2013.01); *G06Q 30/018* (2013.01); *G06Q 50/163* (2013.01); *G08B 13/1965* (2013.01); *H04L 67/12* (2013.01); *H04N 5/23206* (2013.01); *B64C 2201/127* (2013.01); *B64C 2201/141* (2013.01); *B64C 2201/146* (2013.01); *H04N 5/23203* (2013.01)

(58) Field of Classification Search
None
See application file for complete search history.

(56) References Cited

U.S. PATENT DOCUMENTS 4,736,331 A * 4/1988 Lappos ................. B64D 43/00
                                                  701/14
8,116,928 B2 * 2/2012 Wu ...................... G05D 1/0246
                                                  700/253
(Continued)

FOREIGN PATENT DOCUMENTS

KR    10-2015-0105659    9/2015
KR    10-1638500         7/2016

*Primary Examiner* — Nicholas K Wiltey
(74) *Attorney, Agent, or Firm* — JCIPRNET

(57) ABSTRACT

Provided are a facility management system and method using an Internet of things (IoT) based sensor and an unmanned aerial vehicle (UAV). The facility management system and method may determine a current status and an abnormal behavior of a facility by primarily measuring the abnormal behavior of the facility in real time by a plurality of IoT based sensors included in the facility and secondarily precisely measuring the abnormal behavior of the facility by capturing an image through a UAV when necessary or when the abnormal behavior is detected, and may prevent a false alarm due to an error of a measurement sensor by performing two inspections through the IoT based sensor unit and the UAV.

17 Claims, 9 Drawing Sheets

(51) Int. Cl.
*G08B 13/196* (2006.01)
*G05D 1/00* (2006.01)
*B64C 39/02* (2006.01)
*G06Q 30/00* (2012.01)
*G06Q 50/16* (2012.01)
*H04L 29/08* (2006.01)

(56) References Cited

U.S. PATENT DOCUMENTS

| | | | | |
|---|---|---|---|---|
| 8,181,903 | B2* | 5/2012 | Posva | B64C 15/14 244/12.3 |
| 9,508,263 | B1* | 11/2016 | Teng | B64C 39/024 |
| 9,589,448 | B1* | 3/2017 | Schneider | G08B 25/016 |
| 9,609,288 | B1* | 3/2017 | Richman | H04N 7/183 |
| 9,643,722 | B1* | 5/2017 | Myslinski | B64C 39/024 |
| 9,817,396 | B1* | 11/2017 | Takayama | G05D 1/0038 |
| 9,826,415 | B1* | 11/2017 | Byrne | G08B 25/10 |
| 10,137,984 | B1* | 11/2018 | Flick | B64C 39/024 |
| 10,395,544 | B1* | 8/2019 | Harris | B64D 45/04 |
| 2005/0131607 | A1* | 6/2005 | Breed | B60N 2/002 701/45 |
| 2008/0009965 | A1* | 1/2008 | Bruemmer | G05D 1/0088 700/245 |
| 2008/0061959 | A1 | 3/2008 | Breed | |
| 2008/0144884 | A1* | 6/2008 | Habibi | G01C 11/02 382/103 |
| 2008/0210810 | A1* | 9/2008 | Parmley | B64B 1/06 244/30 |
| 2009/0265193 | A1* | 10/2009 | Collins | G06Q 30/0185 705/4 |
| 2009/0274345 | A1* | 11/2009 | Hanna | G06K 9/00604 382/115 |
| 2009/0326792 | A1* | 12/2009 | McGrath | G01W 1/08 701/120 |
| 2010/0004798 | A1* | 1/2010 | Bodin | G01S 19/14 701/2 |
| 2010/0063673 | A1* | 3/2010 | Anderson | G05D 1/0287 701/29.2 |
| 2011/0046817 | A1* | 2/2011 | Hamke | G05D 1/101 701/3 |
| 2011/0123135 | A1* | 5/2011 | Hsieh | G06K 9/00201 382/285 |
| 2011/0144828 | A1* | 6/2011 | Chengalva | F41H 7/005 701/2 |
| 2011/0320068 | A1* | 12/2011 | Lee | G05D 1/0011 701/2 |
| 2012/0136574 | A1* | 5/2012 | Kobayashi | B60L 3/12 701/533 |
| 2014/0025235 | A1* | 1/2014 | Levien | G05D 1/00 701/3 |
| 2014/0032034 | A1* | 1/2014 | Raptopoulos | G08G 5/0069 701/25 |
| 2015/0148988 | A1* | 5/2015 | Fleck | G05D 1/0011 701/2 |
| 2015/0269438 | A1* | 9/2015 | Samarasekera | G06K 9/00637 382/154 |
| 2015/0321758 | A1* | 11/2015 | Sarna, II | G05D 1/0011 244/63 |
| 2015/0332206 | A1* | 11/2015 | Trew | G06Q 10/0836 705/330 |
| 2015/0336671 | A1* | 11/2015 | Winn | B64C 39/024 701/3 |
| 2016/0035224 | A1* | 2/2016 | Yang | H04B 7/18506 701/23 |
| 2016/0070264 | A1* | 3/2016 | Hu | G08G 5/0069 701/2 |
| 2016/0070265 | A1* | 3/2016 | Liu | B64C 39/024 701/3 |
| 2016/0107749 | A1* | 4/2016 | Mucci | B64C 39/024 701/3 |
| 2016/0116914 | A1* | 4/2016 | Mucci | G05D 1/101 701/2 |
| 2016/0131358 | A1* | 5/2016 | Spiro | H04W 88/08 455/561 |
| 2016/0266577 | A1* | 9/2016 | Kerzner | G05D 1/0022 |
| 2016/0313736 | A1* | 10/2016 | Schultz | G05D 1/0094 |
| 2017/0019388 | A1* | 1/2017 | Kamble | H04L 63/061 |
| 2017/0027045 | A1* | 1/2017 | Chemel | G05B 15/02 |
| 2017/0031369 | A1* | 2/2017 | Liu | G05D 1/102 |
| 2017/0036771 | A1* | 2/2017 | Woodman | B64D 27/26 |
| 2017/0079482 | A1* | 3/2017 | Tsibulevskiy | A47K 3/281 |
| 2017/0110784 | A1* | 4/2017 | Vermes | H01Q 1/2291 |
| 2017/0111102 | A1* | 4/2017 | Fan | H04B 7/18504 |
| 2017/0185849 | A1* | 6/2017 | High | B64C 39/024 |
| 2017/0187993 | A1* | 6/2017 | Martch | B64C 39/024 |
| 2017/0192486 | A1* | 7/2017 | Park | G09G 3/2092 |
| 2017/0236405 | A1* | 8/2017 | Khazanov | G08B 29/185 340/601 |
| 2017/0303082 | A1* | 10/2017 | Jones | G06F 16/951 |
| 2017/0337824 | A1* | 11/2017 | Chen | G08G 5/0086 |
| 2017/0345420 | A1* | 11/2017 | Barnett, Jr. | G06F 3/167 |
| 2017/0351900 | A1* | 12/2017 | Lee | H04N 5/2257 |
| 2018/0025044 | A1* | 1/2018 | Hostetter | B64C 39/024 707/690 |
| 2018/0028364 | A1* | 2/2018 | Erickson | A61B 5/6887 |
| 2018/0037136 | A1* | 2/2018 | Nelson | B60L 5/005 |
| 2018/0072170 | A1* | 3/2018 | Evans | B60L 11/1816 |
| 2018/0101966 | A1* | 4/2018 | Lee | H04N 21/23418 |
| 2018/0102035 | A1* | 4/2018 | Trishaun | G08B 21/0211 |
| 2018/0108260 | A1* | 4/2018 | Kuhara | G01C 21/20 |
| 2018/0111684 | A1* | 4/2018 | Namgoong | B64C 39/024 |
| 2018/0122145 | A1* | 5/2018 | Shimura | G02B 27/0172 |
| 2018/0143035 | A1* | 5/2018 | Ricci | G01S 13/862 |
| 2018/0151045 | A1* | 5/2018 | Kim | B64C 39/024 |
| 2018/0152909 | A1* | 5/2018 | Hanes | H04B 17/27 |
| 2018/0155011 | A1* | 6/2018 | Greiner | B64C 15/02 |
| 2018/0155023 | A1* | 6/2018 | Choi | B64C 39/024 |
| 2018/0178781 | A1* | 6/2018 | Funk | H04W 4/70 |
| 2018/0181091 | A1* | 6/2018 | Funk | H04L 67/12 |
| 2018/0181094 | A1* | 6/2018 | Funk | H04W 4/70 |
| 2018/0181095 | A1* | 6/2018 | Funk | G05B 19/042 |
| 2018/0181116 | A1* | 6/2018 | Lee | G05D 1/101 |
| 2018/0181119 | A1* | 6/2018 | Lee | G05D 1/0038 |
| 2018/0187447 | A1* | 7/2018 | Gharabegian | F21V 33/0004 |
| 2018/0217614 | A1* | 8/2018 | Salas-Moreno | B64C 39/024 |
| 2018/0231394 | A1* | 8/2018 | Goh | G01D 3/08 |
| 2018/0237161 | A1* | 8/2018 | Minnick | B64F 5/00 |
| 2018/0308371 | A1* | 10/2018 | Cao | G08G 5/0069 |
| 2018/0312255 | A1* | 11/2018 | Illuminati | B64C 39/024 |
| 2018/0321692 | A1* | 11/2018 | Castillo-Effen | G05D 1/10 |
| 2018/0322699 | A1* | 11/2018 | Gray | G06T 19/003 |
| 2018/0336768 | A1* | 11/2018 | Sethi | B64C 39/024 |
| 2018/0341706 | A1* | 11/2018 | Agrawal | G06K 9/00758 |
| 2018/0367958 | A1* | 12/2018 | Dizdarevic | H04W 4/70 |
| 2019/0012170 | A1* | 1/2019 | Qadeer | G06F 9/3013 |

* cited by examiner

[FIG. 1A]
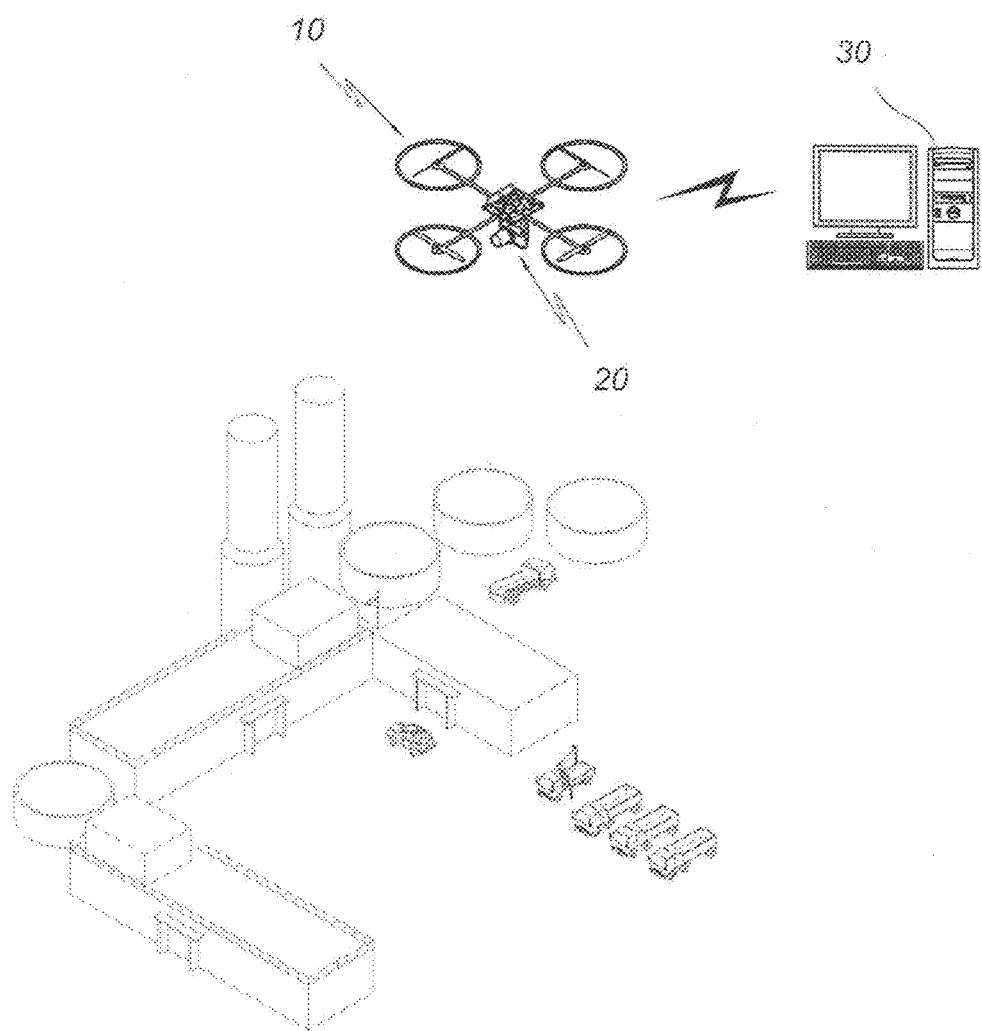

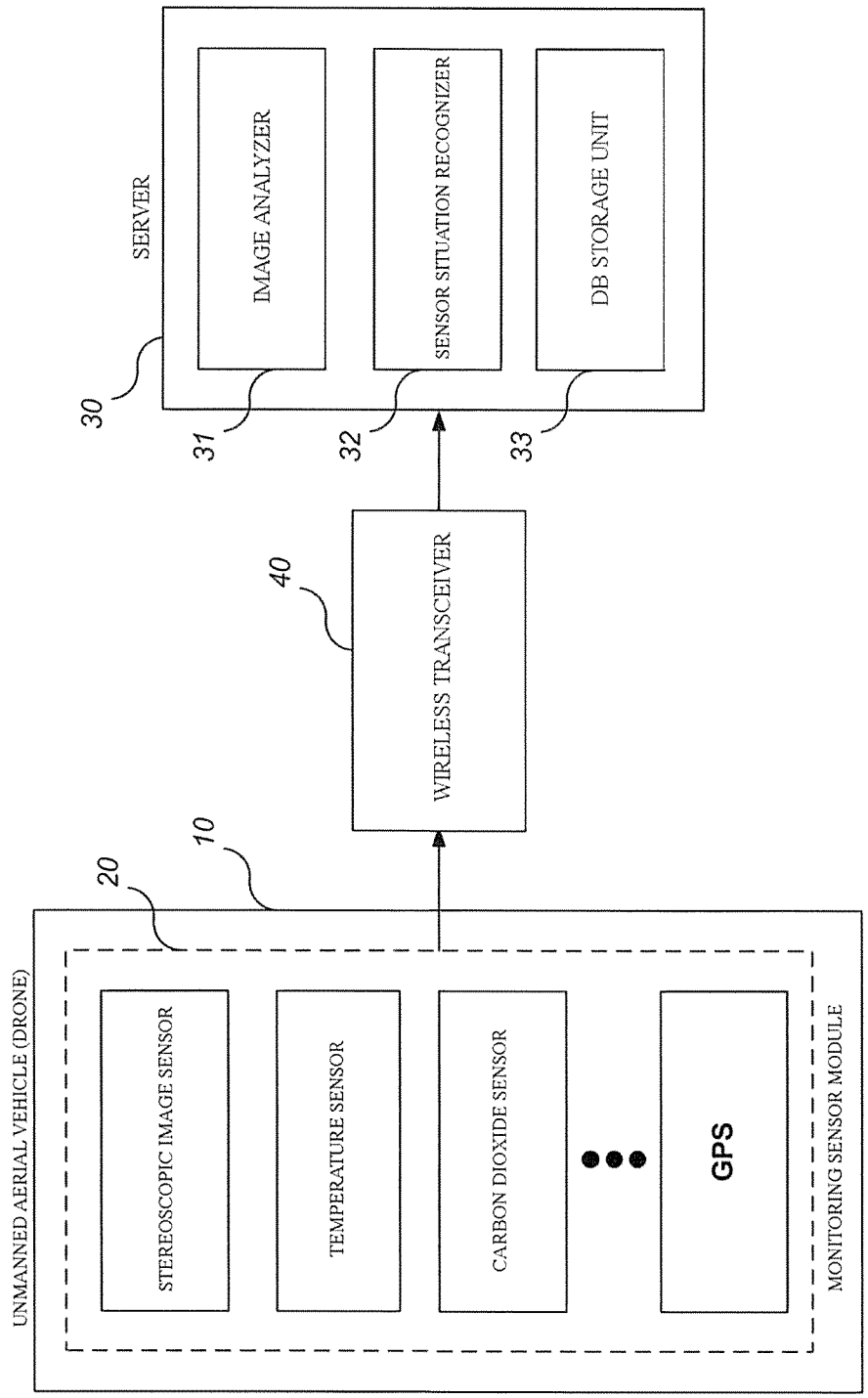
[FIG. 1B]

[FIG. 2A]
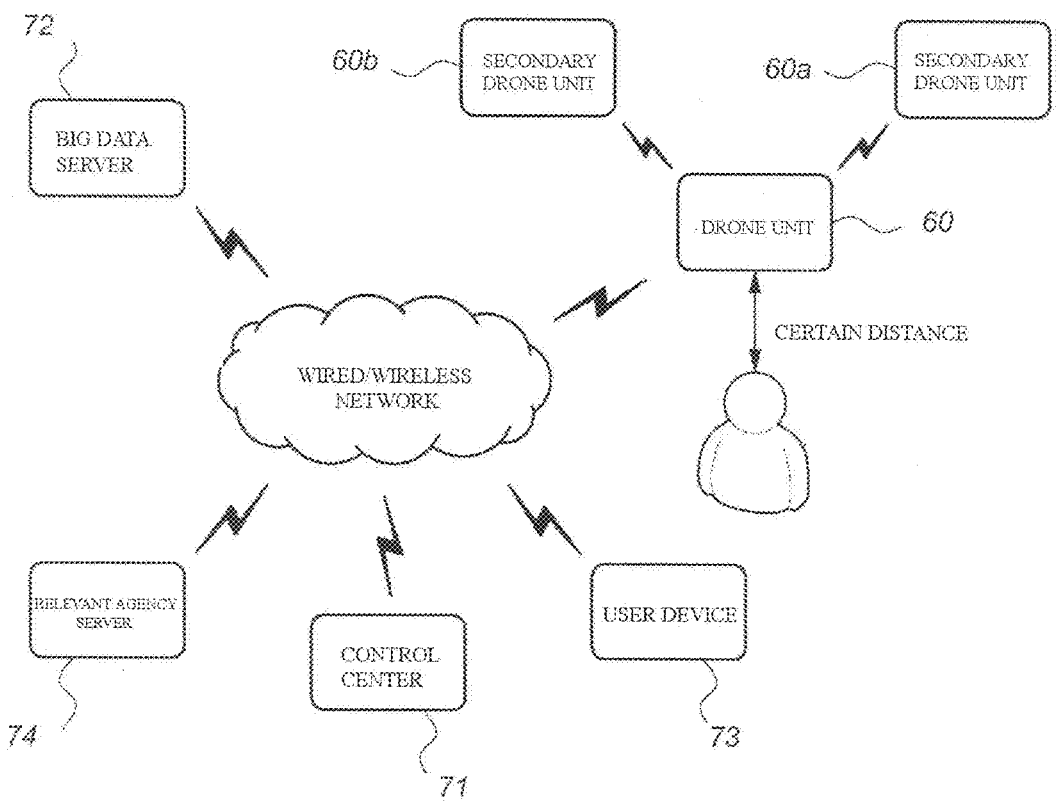
[FIG. 2B]
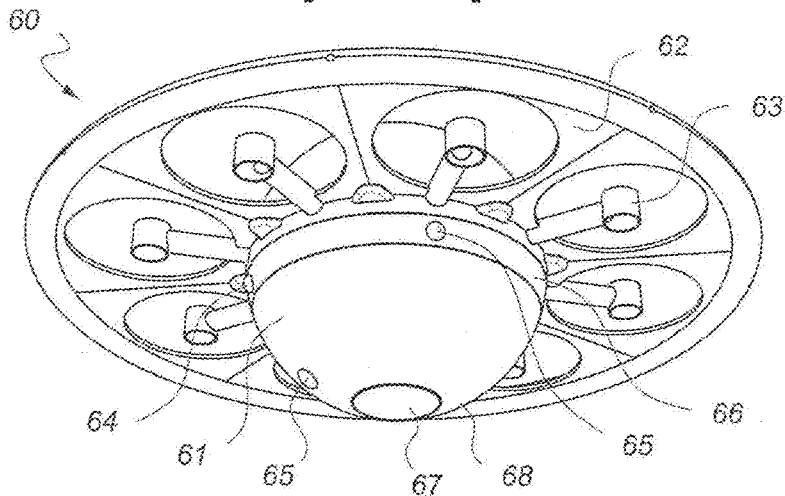

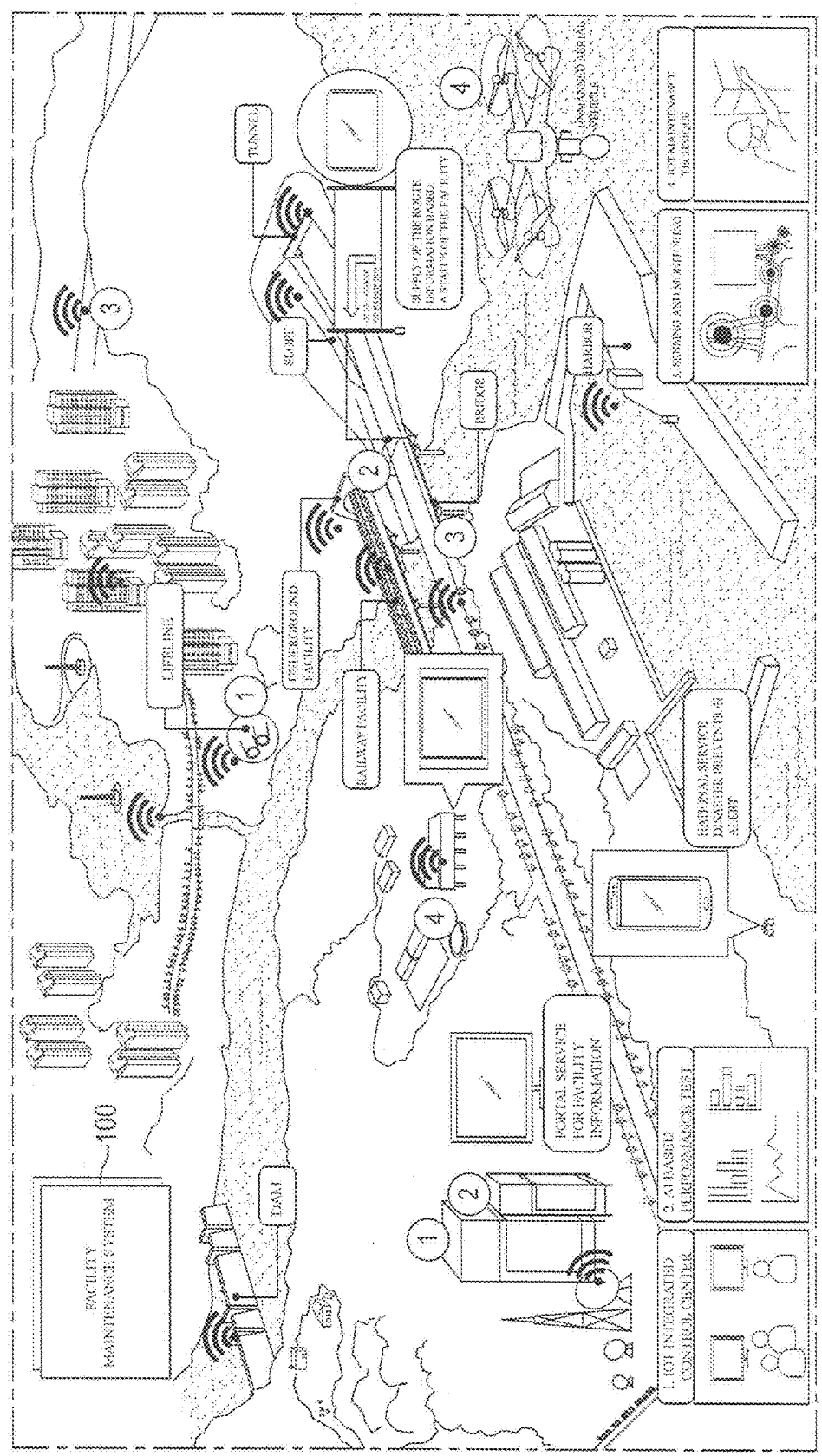
[FIG. 3]

[FIG. 4]
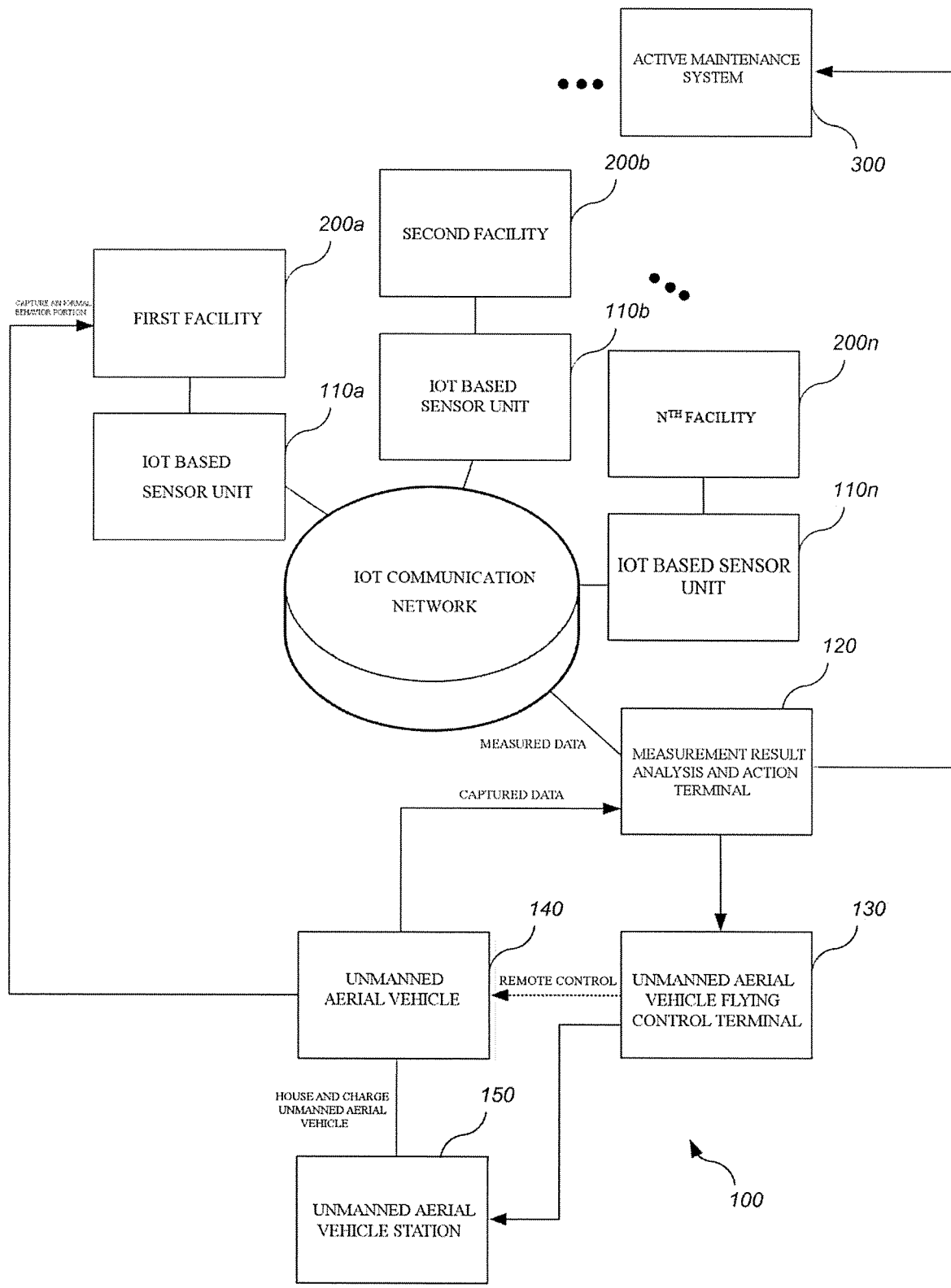

[FIG. 5]
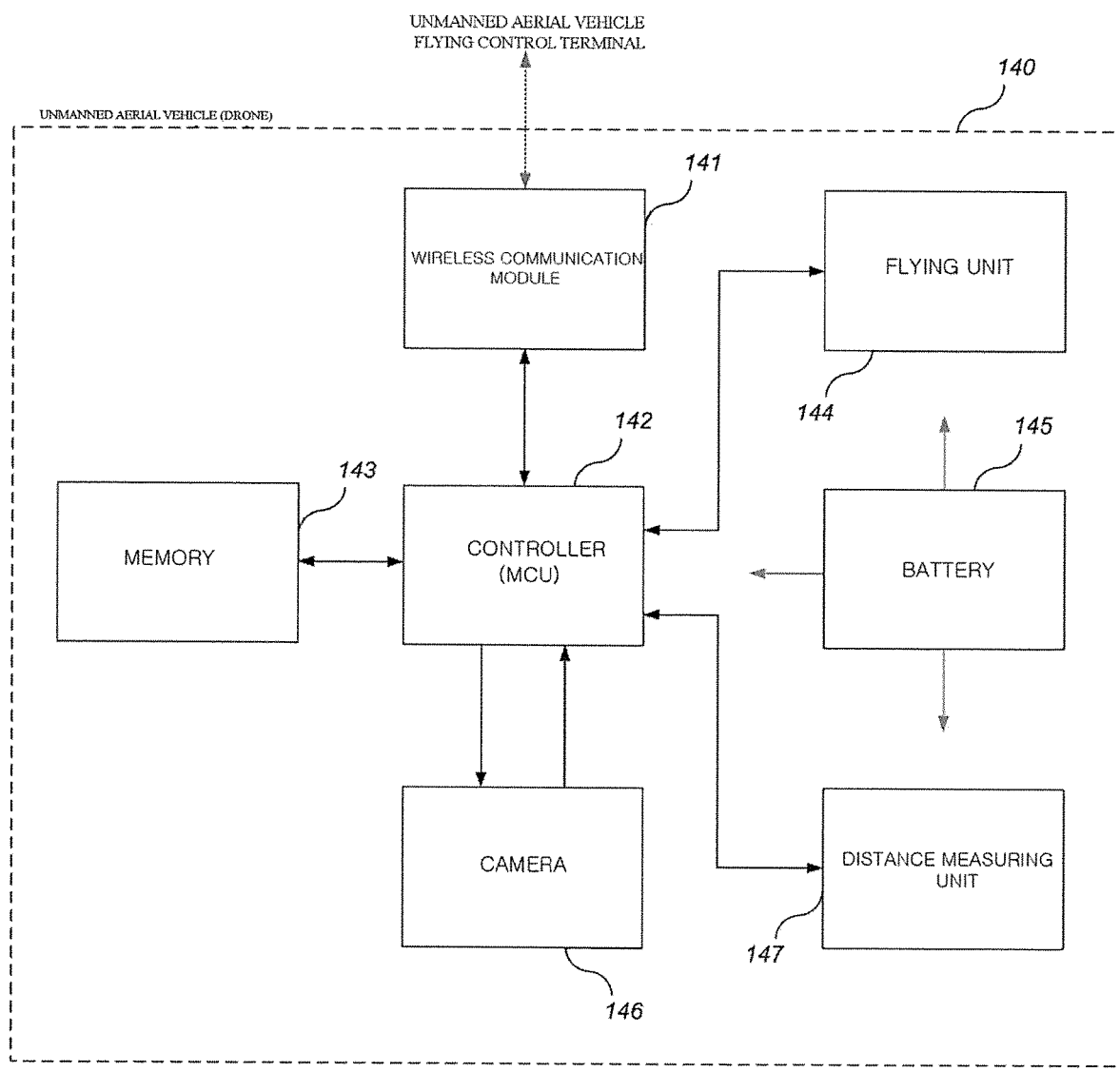

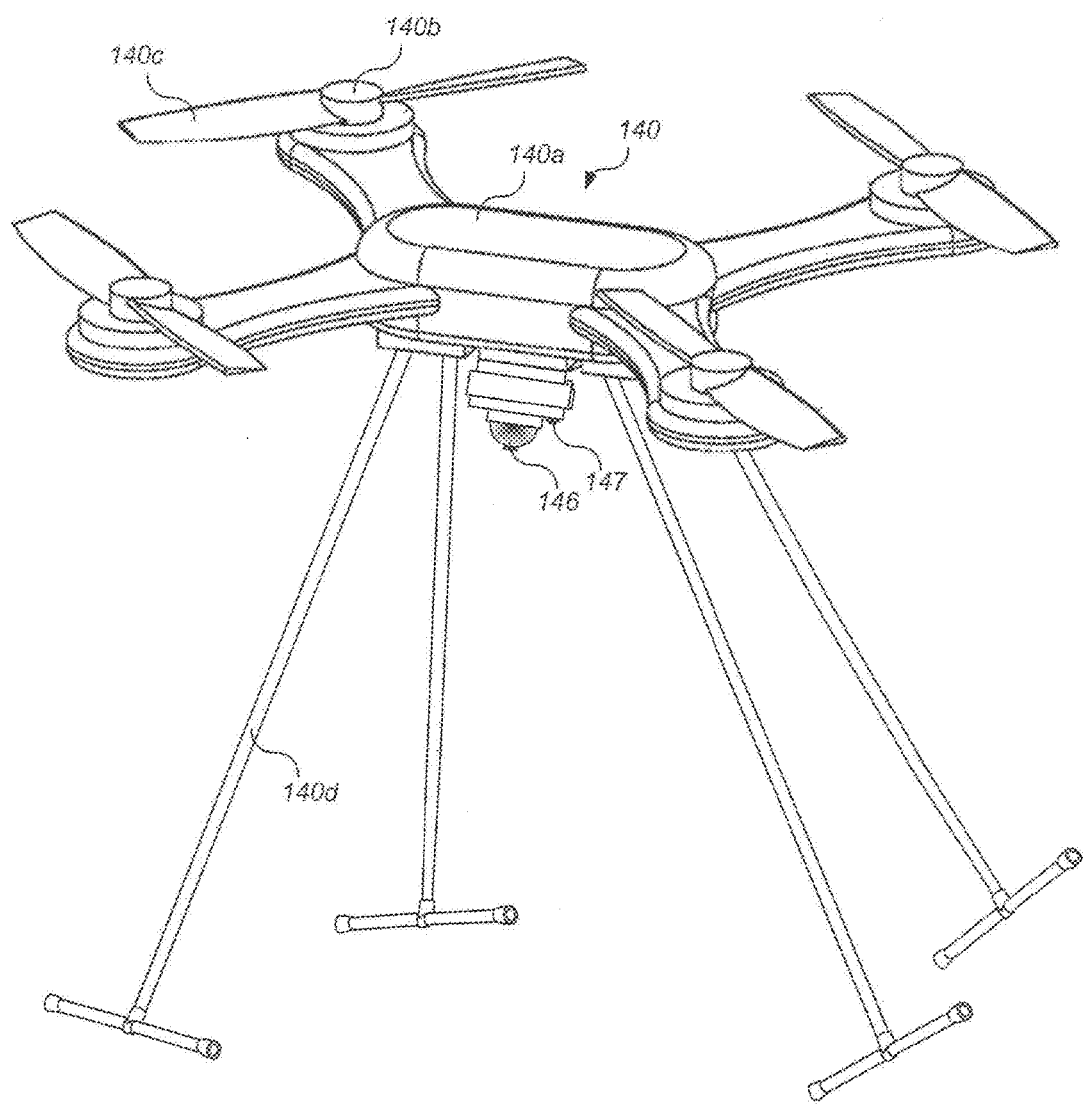
[FIG. 6]

[FIG. 7]
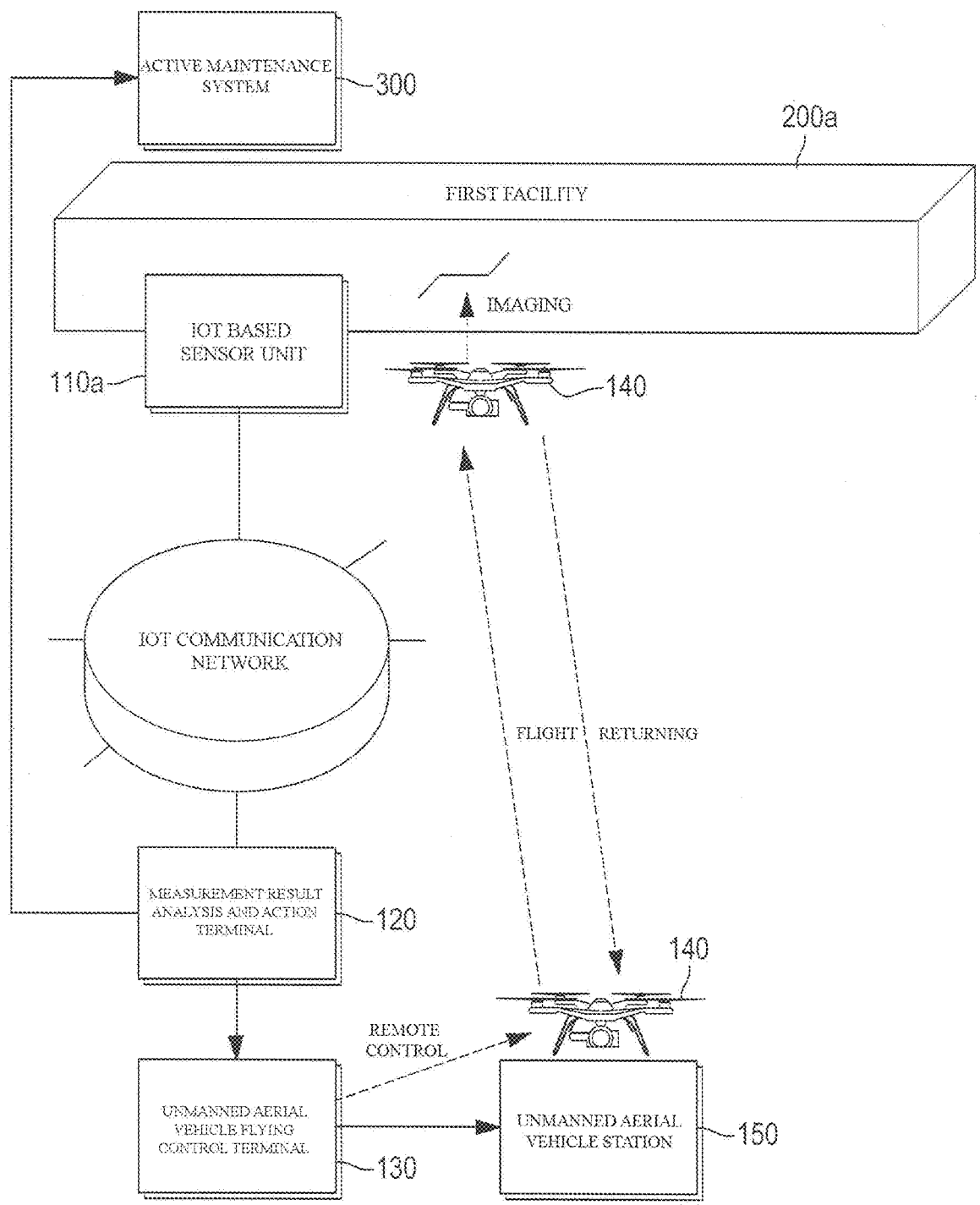

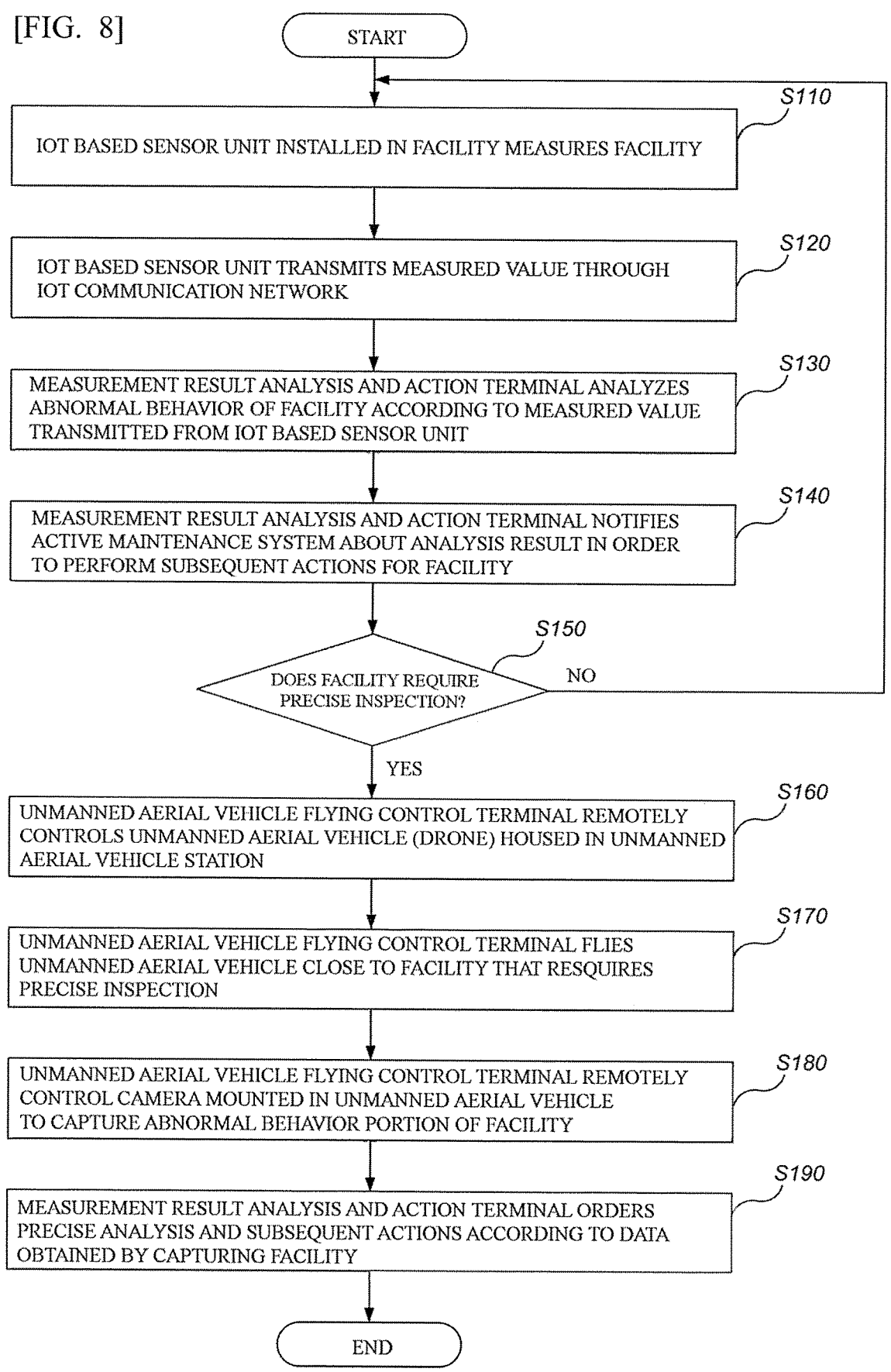

FACILITY MANAGEMENT SYSTEM USING INTERNET OF THINGS (IOT) BASED SENSOR AND UNMANNED AERIAL VEHICLE (UAV), AND METHOD FOR THE SAME

CROSS-REFERENCE TO RELATED APPLICATION

This application claims priority to and the benefit of Korean Patent Application No. 10-2016-0158980, filed on Nov. 28, 2016, the disclosure of which is incorporated herein by reference in its entirety.

BACKGROUND

1. Field of the Invention

The present invention relates to a facility management system, and more particularly, to a facility management system and method using an Internet of things (IoT) based sensor and an unmanned aerial vehicle (UAV). The facility management system and method may determine whether a facility is abnormal by primarily measuring a behavior of the facility in real time using an IoT based sensor provided in the facility and secondarily precisely measuring a status and an abnormal behavior of the facility by capturing an image through a UAV when necessary or when the abnormal behavior is detected.

2. Discussion of Related Art

Generally, an authority that operates and manages a facility frequently accurately recognizes a current status of the facility and repairs or rehabilitates the facility by an appropriate method when the facility is defective to secure safety of the facility and extend a life expectancy of the facility.

Accordingly, since the most basic action for management of a facility is accurately checking a current status of the facility, it is important to recognize a status immediately when an abnormality occurs in the facility in order to prevent damage from spreading in the facility and prevent the occurrence of damage to users of the facility. When a facility is checked periodically due to economic reasons, it is preferable that each period be short.

Also, although main infrastructure facilities are periodically checked in terms of safety, only points accessible by inspectors are checked through a visual inspection, and also check periods are limited due to a shortage of staff and resources and difficulties in checking inaccessible facilities. For example, as the number of old bridges rapidly increases, the demand and frequency of regular inspections increase, and such inspections are substantially performed with the naked eye.

Research is being actively conducted on drones, which are unmanned aerial vehicles (UAVs), and image processing techniques in order to replace such visual inspections. For example, a drone is utilized to image an external appearance of a facility.

Also, it is impossible to secure staff for safety inspections and perform safety inspections on facilities at proper times because many of advanced countries have entered an aging society while the number of facilities has increased. In particular, along with the recent increase in major facilities such as skyscrapers or long-span bridges, there is an increasing need for automated inspections that use various apparatuses because inspectors have limitations in approaching the facilities to perform inspections.

Meanwhile, as a related art, Korean Patent Publication No. 10-2015-0105659 discloses an invention titled "UNMANNED AERIAL VEHICLE BASED STRUCTURE SAFETY INSPECTION SYSTEM USING MULTISENSOR," which will be described with reference to FIGS. 1A and 1B.

FIGS. 1A and 1B are diagrams showing a UAV based structure safety inspection system using multiple sensors according to a conventional technique.

Referring to FIGS. 1A and 1B, the UAV based structure safety inspection system using multiple sensors according to the conventional technique includes a UAV 10, a monitoring sensor module 20, a server 30, and a wireless transceiver 40.

The UAV 10 is a small aircraft that can fly freely in the air by a remote control operation and is equipped with various kinds of sensors in order to perform a safety inspection on a structure. The UAV 10 may be multicopter that stays at one position while maintaining flight altitude or easily moves left, right, up, or down.

The monitoring sensor module 20 is installed in the UAV 10 to monitor or detect a status of a structure. The monitoring sensor module 20 may include one or more sensors selected from among various sensors such as a stereoscopic image sensor, an infrared thermal imaging sensor, a temperature sensor, a humidity sensor, a dust sensor, a smoke sensor, an illumination sensor, a carbon monoxide sensor, a carbon dioxide sensor, an ozone sensor, and an ultrasonic sensor. Two or more such monitoring sensor modules 20 may be installed depending on characteristics of the structure.

The server 30 stores data measured by the monitoring sensor module 20 and determines whether the structure is abnormal on the basis of the stored data. To this end, the server 30 may include an image analyzer 31 configured to output a received image and determine whether the structure is abnormal in appearance, a sensor situation recognizer 32 configured to output a result based on received data and determine whether the structure is abnormal, and a DB storage 33 configured to store the received image and data. Here, the image analyzer 31 performs a process for increasing processing speed and decreasing the amount of storage used by removing noise from the received image through an edge detection method. The image analyzer 31 may simply determine whether the structure is abnormal by comparing the detected image with a pre-captured image.

The wireless transceiver 40 is configured to send the data measured by the monitoring sensor module 20 to the server 30 in real time. Accordingly, a transmission unit of the wireless transceiver 40 is installed in the monitoring sensor module 20 and a reception unit of the wireless transceiver 40 is installed in a terminal that can connect to the server 30.

According to the conventional UAV based structure safety inspection system using multiple sensors, a UAV may be used to safely approach a structure and perform an inspection on the structure, thus improving work safety of a safety inspection, reducing time and costs of the safety inspection and also improving accuracy of the safety inspection. Also, multiple sensors are modularized to facilitate addition and replacement thereof and installed in the UAV.

Meanwhile, as another related art, Korean Patent Publication No. 10-1638500 discloses an invention titled "SURVEILLANCE SYSTEM AND METHOD USING DRONES," which will be described with reference to FIGS. 2A and 2B.

FIGS. 2A and 2B are diagrams showing a surveillance system using drones according to a conventional technique. In detail, FIG. 2A is a block diagram, and FIG. 2B is a diagram showing a drone unit.

As shown in FIG. 2A, the surveillance system using drones according to the conventional technique includes a drone unit 60 configured to perform autonomous movement corresponding to a predetermined target or region, acquire image information and ambient information, and detect a dangerous situation based on the acquired information, and a control center 71 configured to transmit a control command to the drone unit 60 and receive the image information from the drone unit 60. The surveillance system further includes a big data server 72, a user device 73, and a relevant agency server 74.

The drone unit 60 includes at least one sensor in order to acquire image information and ambient information. The drone unit 60 compares a value detected by the sensor with a predetermined reference value, determines a dangerous situation when the value detected by the sensor exceeds the predetermined reference value, and sends dangerous situation information to the control center 71.

Also, the drone unit 60 detects residual energy, calculates energy required to return to a predetermined charging station, and calls secondary drone units 60a and 60b when a value obtained by subtracting the energy required to return from the residual energy is less than or equal to a predetermined threshold value.

As shown in FIG. 2B, the drone unit 60 may include a body 61 in which a power supply, a processor, and a circuit are built, a propeller mounting unit 63 coupled to the body 61 and equipped with a propeller for flight and a motor for driving the propeller, and a cover 62 for protecting the propeller mounting unit 63. The propeller mounting unit 63 may be coupled to the body 61 through a fixing bolt. Also, the drone unit 60 may include a satellite receiver for communication through a Global Positioning System (GPS) or networks.

The drone unit 60 may include an anti-collision sensor, an altitude detection and adjustment sensor, a radar 64 for detecting an object and a human body, and a camera 65 as one or more sensors for detecting an ambient environment. Also, the types of sensor that may be installed in the drone unit 60 are not limited thereto. Also, the camera 65 may be disposed on a rotator 66 and configured to control its own imaging direction by rotating the rotator 66. Also, the drone unit 60 may further include a shock absorber 67 for maintaining body balance and absorbing shock, an electromagnet 68 for mounting items such as emergency goods, etc.

According to the surveillance system using drones according to the conventional technique, it is possible to protect users, reinforce a surveillance system, and enhance productivity due to replacement of human power by performing surveillance on a specific target or region using a drone, which is an unmanned robot.

However, in the surveillance system using drones according to the conventional technique, the drone, which is a UAV, acquires image information and ambient information and detects a dangerous situation based on the acquired information while performing autonomous movement corresponding to a predetermined target or region.

According the conventional technique described above, in order to perform comparative analysis between a previous status and a current status during a visual inspection, it is necessary to capture an image of an inspected portion, but the image capturing is limited due to aerial work. Since regular inspections should be made in a manpower based inspection system, it is difficult to discover abnormality in a facility early and exclude a subjective opinion of an inspector. Thus, it is also difficult to secure consistency of a result of the inspection and almost impossible to track and predict a status of the facility through data obtained by the inspection.

Recently, a drone, which is a small UAV, is utilized for inspection such as imaging an appearance of a facility. However, automatic operation is impossible, and manual operation is performed by a worker near the facility. Also, it is difficult to find a member or portion to be captured close to a structure only with spatial coordinates such as GPS, and there is a limitation in that a result obtained by connecting image result and location information is stored as a record.

Accordingly, in order to perform unmanned automation and management on a facility using various apparatuses, three systems are needed. First, there is a need for a system for detecting abnormality in real time, automatically generating a warning, and notifying a management entity of the abnormality. Second, there is a need for a system for automatically inspecting a facility when an abnormality warning is generated at the facility and reporting a result of the inspection to a management entity. Last, there is a need for a system for immediately analyzing a result of an automatic inspection and automatically restricting access to and maintaining a facility according to a result of the analysis.

SUMMARY OF THE INVENTION

Therefore, embodiments of the present invention are designed to solve the problems of the related art, and it is an objective of the present invention to provide a facility management system and method using an Internet of things (IoT) based sensor and an unmanned aerial vehicle (UAV) that may determine a current status and an abnormal behavior of a facility by primarily measuring the abnormal behavior of the facility in real time using a plurality of IoT based sensors provided in the facility and secondarily precisely measuring the abnormal behavior of the facility using an image captured by a UAV when necessary or when the abnormal behavior is detected.

It is another objective of the present invention to provide a facility management system and method using an IoT based sensor and a UAV that may prevent a false alarm due to an error in a measurement sensor and quickly and safely maintain a facility using an IoT based sensor and a UAV by performing two inspections through the IoT based sensor and the UAV.

It is still another objective of the present invention to provide a facility management system and method using an IoT based sensor and a UAV that may detect a structural damage in real time when a structural damage occurs in the facility, automatically generate an alarm, notify a management entity of the alarm, automatically inspect the facility, immediately analyze a result of the automatic inspection, and automatically carry out a follow-up action by using the IoT based sensor and the UAV.

According to an aspect of the present invention, there is provided a facility management system using an IoT based sensor and a UAV, the facility management system including at least one IoT based sensor unit installed in a facility requiring management and safety inspection and configured to measure an abnormal behavior of the facility; a measurement result analysis and action terminal connected to the IoT based sensor unit over an IoT communication network and configured to collect and analyze a signal measured by the IoT based sensor unit, determine whether the facility has an abnormal behavior, and take an action corresponding to the determination; a UAV configured to fly close to the facility and capture an image of the facility to determine whether the facility is abnormal; and a UAV flying control terminal configured to remotely control calling, returning, flight, charging, facility recognition, and image capturing of the UAV in response to the action of the measurement result analysis and action terminal. When the abnormal behavior of the facility is primarily measured by the IoT based sensor unit, the abnormal behavior of the facility is secondarily precisely measured by the UAV capturing an image to determine whether the facility is abnormal.

When the IoT based sensor unit installed in the facility generates an abnormal signal and the UAV flying control terminal provides a calling command to the UAV, the UAV may approach the IoT based sensor unit by automatic navigation through a recognition tag including an identification number, GPS coordinates, or a QR code of the IoT based sensor unit.

The facility management system may further include a UAV station having a charging device for charging a battery of the UAV and configured to house the UAV.

The IoT based sensor unit may include at least one measurement sensor, a power supply device, and an IoT network communication device. The IoT based sensor unit may have a unique identification number assigned thereto and a recognition tag including an identification number, GPS coordinates, or a QR code attached thereto. The IoT based sensor unit may generate a location signal as necessary.

When it is predicted that there will be abnormality corresponding to a damage, collapse, fire, or accident of the facility through a lack of response, a power-off, etc. of the measurement sensor in the IoT based sensor unit, an adjacent IoT based sensor unit may detect the abnormality and may immediately restrict access to the facility and call the UAV and a manager.

The measurement result analysis and action terminal may determine whether the facility is abnormal by comparing a measurement result transmitted from the IoT based sensor unit with a predetermined threshold value as well as an initial value or by recognizing a change in an image.

The measurement result analysis and action terminal may determine whether the facility has the abnormal behavior, notify a manager about an action when the action is needed to immediately stop using the facility, and automatically take the action needed to stop using the facility when the manager cannot respond immediately.

The measurement result analysis and action terminal may notify an active management system for maintaining the facility about a result of the measurement in order to enable the active management system to perform a subsequent action.

The facility may include a highway network, building, a dam, a bridge, a harbor, a railway facility, an underground facility, a slope, a tunnel, or a lifeline facility.

The UAV may include a camera rotatably mounted in the UAV and configured to capture an abnormal behavior portion of the facility; a wireless communication module configured to receive a remote control signal from the UAV flying control terminal and send an image signal captured by the camera to the measurement result analysis and action terminal; a flying unit configured to operate the UAV to fly according to the remote control signal transmitted by the UAV flying control terminal; a controller configured to control the flying unit according to the remote control signal received through the wireless communication module, control operation of the camera, and control transmission of data captured by the camera to the measurement result analysis and action terminal through the wireless communication module; a memory configured to store the data captured by the camera; and a battery configured to supply power to the wireless communication module, the controller, the memory, the flying unit, and the camera.

The UAV may further include a distance measuring unit mounted in the UAV and configured to measure a distance between the camera and the facility, and the distance measuring unit may be a laser or ultrasonic transceiver and configured to measure a distance between the camera and a surface of the facility.

According to another aspect of the present invention, there is provided a facility management method using an IoT based sensor and a UAV, the facility management method including a) measuring, by an IoT based sensor installed in the facility, an abnormal behavior of a facility and transmitting the abnormal behavior through an IoT communication network; b) analyzing, by a measurement result analysis and action terminal, the abnormal behavior of the facility according to the measured value transmitted from the IoT based sensor unit; c) determining, by the measurement result analysis and action terminal, whether precise inspection of the facility is necessary; d) remotely controlling a UAV housed in a UAV station by using a UAV flying control terminal when precise inspection is necessary; e) automatically flying the UAV close to the IoT based sensor unit included in the facility that requires precise inspection; f) remotely controlling a camera installed in the UAV to capture an abnormal behavior portion of the facility; and g) ordering, by the measurement result analysis and action terminal, precise analysis and taking subsequent actions according to data obtained by capturing the facility, wherein in step a), when the abnormal behavior of the facility is primarily measured by the IoT based sensor unit, the abnormal behavior of the facility is secondarily precisely measured by the UAV capturing an image to determine whether the facility is abnormal.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which:

FIGS. 1A and 1B are diagrams showing an unmanned aerial vehicle (UAV) based structure safety inspection system using multiple sensors according to a conventional technique;

FIGS. 2A and 2B are diagrams showing a surveillance system using drones according to a conventional technique;

FIG. 3 is a diagram illustrating a facility to which a facility management system using an Internet of things (IoT) based sensor and a UAV is applied according to an embodiment of the present invention;

FIG. 4 is a block diagram of a facility management system using an IoT based sensor and a UAV according to an embodiment of the present invention;

FIG. 5 is a detailed block diagram showing a UAV in a facility management system using an IoT based sensor and a UAV according to an embodiment of the present invention;

FIG. 6 is a diagram illustrating a UAV in a facility management system using an IoT based sensor and a UAV according to an embodiment of the present invention;

FIG. 7 is a detailed diagram illustrating operation of a facility management system using an IoT based sensor and a UAV according to an embodiment of the present invention; and FIG. 8 is an operational flowchart of a facility management method using an IoT based sensor and a UAV according to an embodiment of the present invention.

DETAILED DESCRIPTION OF EXEMPLARY EMBODIMENTS

Hereinafter, embodiments of the present invention will be described in detail to be easily embodied by those skilled in the art with reference to the accompanying drawings. However, the present invention may be embodied in many different forms and is not to be construed as being limited to the embodiments set forth herein. In the accompanying drawings, portions irrelevant to a description of the exemplary embodiments will be omitted for clarity. Moreover, like reference numerals refer to like elements throughout.

Furthermore, when one part is referred to as "comprising" (or "including" or "having") other elements, it should be understood that the part can comprise (or include or have) only the other elements, or the part can comprise (or include or have) another element as well as the other elements unless specifically described otherwise. Moreover, terms such as "unit" used herein refer to an element for performing at least one function or operation, and such an element may be implemented as hardware, software, or a combination thereof.

[Facility Management System 100 Using Internet of Things (IoT) Based Sensor and Unmanned Aerial Vehicle (UAV)]

FIG. 3 is a diagram illustrating a facility to which a facility management system using an IoT based sensor and a UAV is applied according to an embodiment of the present invention.

Referring to FIG. 3, the facility management system 100 using an IoT based sensor and a UAV according to an embodiment of the present invention may be applied to various facilities. Here, the facilities may include, but are not limited to, buildings, dams, bridges, harbors, railway facilities, underground facilities, slopes, tunnels, or lifeline facilities.

The facility management system using an IoT based sensor and a UAV according to an embodiment of the present invention may determine whether a facility is abnormal by primarily measuring an abnormal behavior of the facility using the IoT based sensor and secondarily precisely measuring an abnormal behavior of the facility through an image captured by the UAV. In this case, the IoT based sensor is installed in the facility and configure to measure the abnormal behavior of the facility, connect to the Internet through an IoT, and transmit data obtained by the measurement. Also, the UAV flies close to the facility and secondarily captures an image to determine whether the facility is abnormal.

Here, the IoT refers to an intelligent technology and service for connecting all things on the basis of the Internet and communicating information between people and things or between things. The IoT has evolved from the Internet based on conventional wired communication or mobile Internet. A device connected to the Internet sends, receives, and processes information without the intervention of people. This is similar to an existing Ubiquitous or Machine to Machine (M2M) in that things communicate with each other without depending on people. However, the concept of M2M has expanded to the Internet and may evolve into the concept of exchanging all information in real world and virtual world.

The facility management system 100 according to an embodiment of the present invention uses an IoT based sensor and a UAV and will be described in detail with reference to FIGS. 4 to 8.

FIG. 4 is a block diagram of a facility management system using an IoT based sensor and a UAV according to an embodiment of the present invention.

Referring to FIG. 4, the facility management system 100 using an IoT based sensor and a UAV according to an embodiment of the present invention includes IoT based sensor units 110a to 110n, a measurement result analysis and action terminal 120, a UAV flying control terminal 130, a UAV 140, and a UAV station 150.

The IoT based sensor units 110a to 110n are respectively installed in main members of facilities 200a to 200n requiring management and safety inspection to measure an abnormal behavior of the facilities 200a to 200n. For example, each of the IoT based sensor units 110a to 110n may include at least one measurement sensor, a power supply device, and an IoT network communication device. A unique identification number is allocated to each of the IoT based sensor units 110a to 110n, and an identification tag such as a QR code is attached to each of the IoT based sensor units 110a to 110n so that the UAV 140 may automatically approach the IoT based sensor units 110a to 110n by using an image in addition to GPS coordinates. The IoT based sensor units 110a to 110n may generate a location signal as necessary. Also, the IoT based sensor units 110a to 110n may be independently provided with an imaging apparatus, a strain gauge, a displacement meter, an accelerometer, a temperature sensor, a humidity sensor, a corrosion measuring instrument, or a combination thereof according to a purpose of measurement. Also, the IoT based sensor units 110a to 110n may be respectively embedded in or attached to the main members of the existing facilities 200a to 200n in addition to a new facility.

Accordingly, a result obtained by measuring a behavior of each of the facilities 200a to 200n in real time is sent to the measurement result analysis and action terminal 120 that is connected to the IoT communication network through the IoT network communication device included in each of the IoT based sensor units 110a to 110n and that is installed in each of the facilities 200a to 200n or installed separately from the facilities 200a to 200n.

In this case, in order to operate with minimum power, the IoT based sensor units 110a to 110n may minimize sensors that receive power to perform continuous measurement and allow the remaining sensors to be in standby status or to self-generate and store necessary power using solar cell panels and storage batteries (not shown) included in each of the IoT based sensor units 110a to 110n.

When an abnormal value of any one of the facilities 200a to 200n is measured by the measurement sensor of a corresponding one of the IoT based sensor units 110a to 110n, the corresponding IoT based sensor unit may transmit a signal to an adjacent or another IoT based sensor unit and thus allow all of the IoT based sensor units 110a to 110n to perform measurement to measure detailed values of all of the facilities 200a to 200n. In particular, when it is predicted that there will be abnormality corresponding to a collapse, fire, or accident of a facility through a lack of response, powering off, etc. of the measurement sensor in any one of the IoT based sensor units 110a to 110n, an adjacent IoT based sensor unit detects the abnormality and immediately restricts access to a corresponding one of the facilities 200a to 200n and calls the UAV 140 and a manager.

Referring to FIG. 4 again, the measurement result analysis and action terminal 120 is connected to the IoT based sensor units 110a to 110n through the IoT communication network and is configured to collect and analyze a signal measured by each of the IoT based sensor units 110a to 110n, determine whether each of the facilities 200a to 200n has an abnormal behavior, and take an action corresponding to the abnormality.

In detail, the measurement result analysis and action terminal 120 determines whether each of the facilities 200a to 200n is abnormal by comparing a measurement result transmitted from each of the IoT based sensor units 110a to 110n with a predetermined threshold value as well as an initial value or by recognizing a change in an image acquired with a certain time difference. In this case, the manager may perform structural interpretation on each of the facilities 200a to 200n, set a value measurable in a normal range as a predetermined threshold value, and compare the measured value with the threshold value. In addition, the measurement result analysis and action terminal 120 may determine whether each of the facilities 200a to 200n is abnormal by utilizing an artificial intelligence based evaluation algorithm installed therein.

Accordingly, when a signal indicating abnormality of any one of the facilities 200a to 200n is detected according to a result of the analysis of the measurement value, the measurement result analysis and action terminal 120 automatically notifies the manager, who is a management entity, about the signal using the IoT communication network. Even when there is no order from the manager, particularly, outside office hours, the measurement result analysis and action terminal 120 automatically instructs the UAV flying control terminal 130 to call a drone, which is the UAV 140, to precisely inspect any one of the facilities 200a to 200n in order to primarily determine whether the facility is abnormal.

Also, the measurement result analysis and action terminal 120 analyzes data that is previously measured and image information that is collected, notifies the manager about an action when it is determined that the action is needed, and automatically delivers a result of the action to an active management system 300 corresponding to the facilities 200a to 200n when the manager cannot respond immediately, e.g., at night. Also, when an action needed to immediately stop using any one of the facilities 200a to 200n is necessary, the measurement result analysis and action terminal 120 notifies the manager about the action. In particular, when the manager cannot respond immediately, e.g., at night, the measurement result analysis and action terminal 120 automatically performs an action needed to stop using any one of the facilities 200a to 200n. For example, for a road, a road structure, etc., the action includes sending warning signals for traffic restriction, operating a blocking device, sending messages about the action to a user's mobile phone, etc.

Referring to FIG. 4 again, the UAV flying control terminal 130 remotely controls calling, returning, flight, charging, facility recognition, and image capturing of the UAV 140 in response to the action of the measurement result analysis and action terminal 120. In this case, the UAV flying control terminal 130 may be equipped with an algorithm and a processor that may control calling, returning, flight, charging, recognition of facility and a corresponding member/portion, and image capturing of the UAV 140.

Accordingly, the UAV 140 that is called by the order of the UAV flying control terminal 130 automatically approaches any one of the facilities 200a to 200n on the basis of an identification number, GPS coordinates, or a QR code tag and collects images thereof. In particular, the UAV 140 performs precise flaw detection on a status of a member at which any one of the IoT based sensor units 110a to 110n and a measurement sensor of the any one of the IoT based sensor units 110a to 110n determined to have transmitted an abnormal signal are embedded or attached and collect images thereof. The collected images and location information are automatically transmitted to the measurement result analysis and action terminal 120 for the purpose of reanalysis and recording.

The UAV 140 flies close to any one of the facilities 200a to 200n and captures an image to determine whether the facility is abnormal. Here, the UAV 140 will be described in detail below with respect to FIGS. 5 and 6.

The UAV station 150 includes a charging device for charging a battery of the UAV 140 and houses the UAV 140.

Thus, when an abnormal behavior of any one of the facilities 200a to 200n is primarily measured by a corresponding one of the IoT based sensor units 110a to 110n, an abnormal behavior of the facility is secondarily precisely measured by capturing an image through the UAV 140 to determine whether the facility is abnormal.

FIG. 5 is a detailed block diagram showing a UAV in a facility management system using an IoT based sensor and a UAV according to an embodiment of the present invention, and FIG. 6 is a diagram illustrating a UAV in a facility management system using an IoT based sensor and a UAV according to an embodiment of the present invention.

Referring to FIG. 5, in a facility management system using an IoT based sensor and a UAV according to an embodiment of the present invention, the UAV 140 includes a wireless communication module 141, a controller 142, a memory 143, a flying unit 144, a battery 145, a camera 146, and a distance measuring unit 147. As shown in FIG. 6, the UAV 140 includes a UAV body 140a, a propeller motor 140b, a propeller 140c, and a landing support 140d.

The camera 146 is rotatably mounted in the UAV 140 to capture an image of an abnormal behavior portion of any one of the facilities 200a to 200n.

The wireless communication module 141 receives a remote control signal from the UAV flying control terminal 130 and sends image signals captured by the camera 146 to the measurement result analysis and action terminal 120.

The controller 142 controls the flying unit 144 according to the remote control signal received through the wireless communication module 141, controls operation of the camera 146, and controls transmission of data captured by the camera 146 to the measurement result analysis and action terminal 120 through the wireless communication module 141. The memory 143 stores data captured by the camera 146.

The flying unit 144 operates under control of the controller 142 so that the UAV 140 may fly according to the remote control signal transmitted to the UAV flying control terminal 130.

The battery 145 may supply electric power to the wireless communication module 141, the controller 142, the memory 143, the flying unit 144, and the camera 146.

The distance measuring unit 147 is mounted on the UAV 140 to measure a distance between the camera 146 and any one of the facilities 200a to 200n. For example, the distance measuring unit 147 is a laser or ultrasonic transceiver and may accurately measure a distance between the camera 146 and a surface of a facility.

Also, an illumination providing unit (not shown) may be mounted on the UAV 140 to provide illumination to any one of the facilities 200a to 200n when the facility is imaged through the camera 146.

According to a facility management system using an IoT based sensor and a UAV according to an embodiment of the present invention, it is possible to determine a current status and an abnormal behavior of a facility by primarily measuring the abnormal behavior of the facility in real time by a plurality of IoT based sensors included in the facility and secondarily precisely measuring the abnormal behavior of the facility by capturing an image through a UAV when necessary or when the abnormal behavior is detected, prevent a false alarm due to an error of a measurement sensor by performing two inspections through the IoT based sensor unit and the UAV, and refer to status information of the facility even when a facility manager performs precise diagnosis and repair and determines reinforcing priorities. Also, it is possible to detect a damage in real time when the damage occurs in a facility, automatically generate an alarm, notify a management entity of the alarm, automatically inspect the facility, immediately analyze a result of the automatic inspection, and automatically carry out a follow-up action by using the IoT based sensor and the UAV.

[Facility Management Method Using IoT Based Sensor and UAV]

FIG. 7 is a detailed diagram illustrating operation of a facility management system using an IoT based sensor and a UAV according to an embodiment of the present invention, and FIG. 8 is an operational flowchart of a facility management method using an IoT based sensor and a UAV according to an embodiment of the present invention.

Referring to FIGS. 7 and 8, in a facility management method using an IoT based sensor and a UAV according to an embodiment of the present invention, first, the IoT based sensor units 110a to 110n respectively installed in the facilities 200a to 200n measure an abnormal behavior of the facilities 200a to 200n (S110). In detail, each of the IoT based sensor units 110a to 110n may include at least one measurement sensor, a power supply device, and an IoT network communication device. Each of the IoT based sensor units 110a to 110n has a unique identification number assigned thereto and may generate a location signal as necessary.

Next, each of the IoT based sensor units 110a to 110n sends a measured value through an IoT communication network (S120).

Next, the measurement result analysis and action terminal 120 analyzes the abnormal behavior of any one of the facilities 200a to 200n according to the measured value sent from a corresponding one of the IoT based sensor units 110a to 110n (S130).

Next, the measurement result analysis and action terminal 120 notifies a manager about a result of the analysis for the purpose of subsequent actions of the active management system 300 for maintaining the facilities 200a to 200n (S140).

Next, the measurement result analysis and action terminal 120 determines whether precise inspection of the one of the facilities 200a to 200n is necessary (S150).

Next, the UAV flying control terminal 130 remotely controls the UAV 140, that is, a drone housed in the UAV station 150 (S160).

Next, the UAV flying control terminal 130 controls the UAV 140 to automatically approach the corresponding one of the IoT based sensor units 110a to 110n included in the one of the facilities 200a to 200n requiring the precise inspection (S170).

Next, the UAV flying control terminal 130 remotely controls the camera 146 mounted on the UAV 140 to image an abnormal behavior portion of the one of the facilities 200a to 200n (S180).

Next, the measurement result analysis and action terminal 120 performs precise analysis and takes subsequent actions according to data obtained by imaging the facility (S190). For example, the measurement result analysis and action terminal 120 determines whether any one of the facilities 200a to 200n has an abnormal behavior, notifies a manager about an action when the action is needed to immediately stop using the facility, and automatically takes the action needed to stop using the facility when the manager cannot respond immediately.

According to an embodiment of the present invention, it is possible to objectively manage history of a facility even when a manager of the facility is replaced or a management entity is changed by monitoring abnormal signs of the facility through a standardized IoT based sensor unit and accumulating a status evaluation result. In particular, the abnormal signs of the facility may be measured in real time, and thus it is possible to prevent secondary damage to a user due to damage to the facility and prevent investment of large management costs caused by the damage spreading.

According to an embodiment of the present invention, it is possible to efficiently operate a facility network by tracking status change history of a facility and predicting a subsequent status change. The method and system may be utilized by local governments, public corporations, and the central government such as the Ministry of Land, Infrastructure and Transport in South Korea that directly manages a facility as well as a private corporation entrusted with inspection and management of the facility.

According to an embodiment of the present invention, for a road structure such as a bridge, a tunnel, etc., when a disaster such as an earthquake having a catastrophic effect on the facility occurs, the management entity may generate an alarm for a user without separate visual inspection, immediately check damage, safety, and usability of the facility, and deliver a result thereof to users of the facility through mobile phones, thus increasing safety of the users.

According to the present invention, it is possible to determine a current status and an abnormal behavior of a facility by primarily measuring the abnormal behavior of the facility using an IoT based sensor and secondarily precisely measuring the abnormal behavior of the facility by capturing an image through a UAV when necessary or when the abnormal behavior is detected.

According to the present invention, it is also possible to prevent a false alarm due to an error in a measurement sensor and quickly and safely maintain a facility using an IoT based sensor and a UAV by performing two inspections through the IoT based sensor and the UAV and also to refer to status information of the facility even when a facility manager performs precise diagnosis and repair and determines reinforcing priorities.

According to the present invention, it is also possible to objectively manage history of a facility even when a manager of the facility is replaced or a management entity is changed by monitoring abnormal signs of the facility through a standardized IoT based sensor unit and accumulating a status evaluation result. In particular, the abnormal signs of the facility may be measured in real time, and thus it is possible to prevent secondary damage to a user due to damage to the facility and prevent investment of large management costs caused by expanding the loss.

According to the present invention, it is also possible to detect a damage in real time when the damage occurs in a facility, automatically generate an alarm, notify a management entity of the alarm, automatically inspect the facility, immediately analyze a result of the automatic inspection, and automatically carry out a follow-up action by using the IoT based sensor and the UAV.

According to the present invention, it is also possible to efficiently operate a facility network by tracking status change history of a facility and predicting a future change in status.

According to the present invention, for a road structure such as a bridge, a tunnel, etc., when a disaster such as an earthquake having a catastrophic effect on the facility occurs, a management entity may generate an alarm for a user without separate visual inspection, immediately check damage, safety, and usability of the facility, and deliver a result thereof to users of the facility through mobile phones, thus increasing safety of the users.

According to the present invention, it is also possible for local governments, public corporations, and the central government such as the Ministry of Land, Infrastructure and Transport in South Korea that directly manages a facility as well as a private corporation entrusted with inspection and management of the facility to utilize the system and method.

The above description is merely illustrative, and it should be understood by those skilled in the art that various changes in form and details may be made therein without departing from the spirit and scope of the invention as defined by the appended claims. The above embodiments are accordingly to be regarded as illustrative rather than restrictive. For example, while a single element may be distributed and then carried out, distributed elements may be carried out in a combination thereof.

Therefore, the scope of the present invention is defined not by the detailed description but by the appended claims, and all changes or modifications within the appended claims and their equivalents should be construed as being included in the scope of the invention.

What is claimed is:

1. A facility management system using an Internet of things (IoT) based sensor and an unmanned aerial vehicle (UAV), the facility management system comprising:
    a first IoT based sensor unit, having a Global Position System (GPS) coordinate and an QR code, installed in a facility requiring management and safety inspection and configured to measure an abnormal behavior of the facility;
    a measurement result analysis and action terminal connected to the first IoT based sensor unit over an IoT communication network and configured to collect and analyze a signal measured by the first IoT based sensor unit, determine whether the facility has an abnormal behavior, and take an action corresponding to the determination;
    a UAV configured to fly to the facility and capture an image of an external appearance of the facility to determine whether the facility is abnormal; and
    a UAV flying control terminal configured to remotely control calling, returning, flight, charging, facility recognition, and image capturing of the UAV in response to the action of the measurement result analysis and action terminal,
    wherein when the abnormal behavior of the facility is primarily measured by the first IoT based sensor unit, the abnormal behavior of the facility is secondarily precisely measured by the UAV capturing the image to determine whether the facility is abnormal,
    wherein when the first IoT based sensor unit detects the abnormal behavior of the facility, the first IoT based sensor unit transmits a signal to a second IoT based sensor unit installed in the facility to enable the second IoT based sensor unit to perform measurement for the abnormal behavior of the facility,
    wherein the UAV is automatically deployed and flown to the GPS coordinate of the first IoT based sensor unit that initially detects the abnormal behavior of the facility and identifies the first IoT based sensor unit by using the QR code in response to the abnormal behavior of the facility measured by the first IoT based sensor unit,
    wherein the abnormal behavior of the facility is a change in the external appearance of the facility structure, and a secondary measurement of the abnormal behavior of the facility is determined by comparing the captured image of the external appearance of the facility structure with a historical image of the facility structure captured in the past.

2. The facility management system of claim 1, wherein when the first IoT based sensor unit installed in the facility generates an abnormal signal, and the UAV flying control terminal provides a calling command to the UAV, the UAV approaches the first IoT based sensor unit by automatic navigation through a recognition tag including an identification number of the first IoT based sensor unit in addition to the QR code of the first IoT based sensor unit.

3. The facility management system of claim 1, further comprising a UAV station having a charging device for charging a battery of the UAV and configured to house the UAV.

4. The facility management system of claim 1, wherein the first IoT based sensor unit includes at least one measurement sensor, a power supply device, and an IoT network communication device, the first IoT based sensor unit has a unique identification number assigned thereto and a recognition tag including an identification number attached thereto, and the first IoT based sensor unit generates a location signal as necessary.

5. The facility management system of claim 4, wherein when abnormality corresponding to a collapse, fire, or accident of the facility is determined based on a lack of response or a power-off of the measurement sensor in the first IoT based sensor unit, and an adjacent IoT based sensor unit detects the abnormality and immediately restricts access to the facility and calls the UAV and a manager.

6. The facility management system of claim 1, wherein the measurement result analysis and action terminal further determines whether the facility is abnormal by comparing a measurement result transmitted from the first IoT based sensor unit with a predetermined threshold value as well as an initial value.

7. The facility management system of claim 1, wherein the measurement result analysis and action terminal determines whether the facility has the abnormal behavior, notifies a manager about an action when the action is needed to immediately stop using the facility, and automatically takes the action needed to stop using the facility when the manager cannot respond immediately.

8. The facility management system of claim 1, wherein the measurement result analysis and action terminal notifies an active management system for maintaining the facility about a result of the measurement in order to enable the active management system to perform a subsequent action.

9. The facility management system of claim 1, wherein the facility includes a building, a dam, a bridge, a harbor, a railway facility, an underground facility, a slope, a tunnel, or a lifeline facility.

10. The facility management system of claim 1, wherein the UAV comprises:
a camera rotatably mounted in the UAV and configured to capture an abnormal behavior portion of the facility;
a wireless communication module configured to receive a remote control signal from the UAV flying control terminal and send an image signal captured by the camera to the measurement result analysis and action terminal;
a flying unit configured to operate the UAV to fly according to the remote control signal transmitted by the UAV flying control terminal;
a controller configured to control the flying unit according to the remote control signal received through the wireless communication module, control operation of the camera, and control transmission of data captured by the camera to the measurement result analysis and action terminal through the wireless communication module;
a memory configured to store the data captured by the camera; and
a battery configured to supply power to the wireless communication module, the controller, the memory, the flying unit, and the camera.

11. The facility management system of claim 10, wherein the UAV further comprises a distance measuring unit mounted in the UAV and configured to measure a distance between the camera and the facility, and the distance measuring unit is a laser or ultrasonic transceiver and is configured to measure a distance between the camera and a surface of the facility.

12. A facility management method using an Internet of things (IoT) based sensor and an unmanned aerial vehicle (UAV), wherein the IoT based sensor include a Global Position System (GPS) coordinate and an QR code, the facility management method comprising:
a) measuring, by first IoT based sensor installed in the facility, an abnormal behavior of a facility and transmitting the abnormal behavior through an IoT communication network;
b) analyzing, by a measurement result analysis and action terminal, the abnormal behavior of the facility according to the measured abnormal behavior of the facility transmitted from the first IoT based sensor unit;
c) determining, by the measurement result analysis and action terminal, whether precise inspection of the facility is necessary;
d) remotely controlling a UAV housed in a UAV station by using a UAV flying control terminal when precise inspection is necessary;
e) automatically flying the UAV to the first IoT based sensor unit included in the facility that requires precise inspection;
f) remotely controlling a camera installed in the UAV to capture an image of an abnormal behavior portion of the facility; and g) ordering, by the measurement result analysis and action terminal, precise analysis and subsequent actions according to the captured image of the abnormal behavior portion,
wherein, in step a), when the abnormal behavior of the facility is primarily measured by the first IoT based sensor unit, the abnormal behavior of the facility is secondarily precisely measured by the UAV capturing an image of an external appearance of the facility to determine whether the facility is abnormal,
wherein when the first IoT based sensor unit detects the abnormal, the first IoT based sensor unit transmits a signal to a second IoT based sensor unit installed in the facility to enable the second IoT based sensor unit to perform measurement for the abnormal behavior of the facility,
wherein the UAV is automatically deployed and flown to the GPS coordinate of the first IoT based sensor unit and identifies the first IoT based sensor unit by using the QC code in response to the abnormal behavior of the facility measured by the first IoT based sensor unit,
wherein the abnormal behavior of the facility is a change in the external appearance of the facility structure, and a secondary measurement of the abnormal behavior of the facility is determined by comparing the captured image of the external appearance of the facility structure with a historical image of the facility structure captured in the past.

13. The facility management method of claim 12, wherein when the first IoT based sensor unit installed in the facility generates an abnormal signal and the UAV flying control terminal provides a calling command to the UAV, the UAV approaches the first IoT based sensor unit by automatic navigation through a recognition tag including an identification number of the first IoT based sensor unit in addition to the QR code of the first IoT based sensor unit.

14. The facility management method of claim 12, wherein, in step b), the measurement result analysis and action terminal notifies an active management system for maintaining the facility about a result of the measurement in order to enable the active management system to perform a subsequent action.

15. The facility management method of claim 12, wherein the facility includes a building, a dam, a bridge, a harbor, a railway facility, an underground facility, a slope, a tunnel, or a lifeline facility.

16. The facility management method of claim 12, wherein, in step a), the first IoT based sensor unit includes at least one measurement sensor, a power supply device, and an IoT network communication device, the first IoT based sensor unit has a unique identification number assigned thereto and a recognition tag including an identification number attached thereto, and the first IoT based sensor unit generates a location signal as necessary.

17. The facility management method of claim 12, wherein, in step g), the measurement result analysis and action terminal determines whether the facility has the abnormal behavior, notifies a manager about an action when the action is needed to immediately stop using the facility, and automatically takes the action needed to stop using the facility when the manager cannot respond immediately.

* * * * *